Feb. 6, 1923.　1,443,959
J. LEDWINKA.
LOCK MECHANISM FOR AUTOMOBILE DOORS.
FILED APR. 4, 1919.　2 SHEETS-SHEET 1
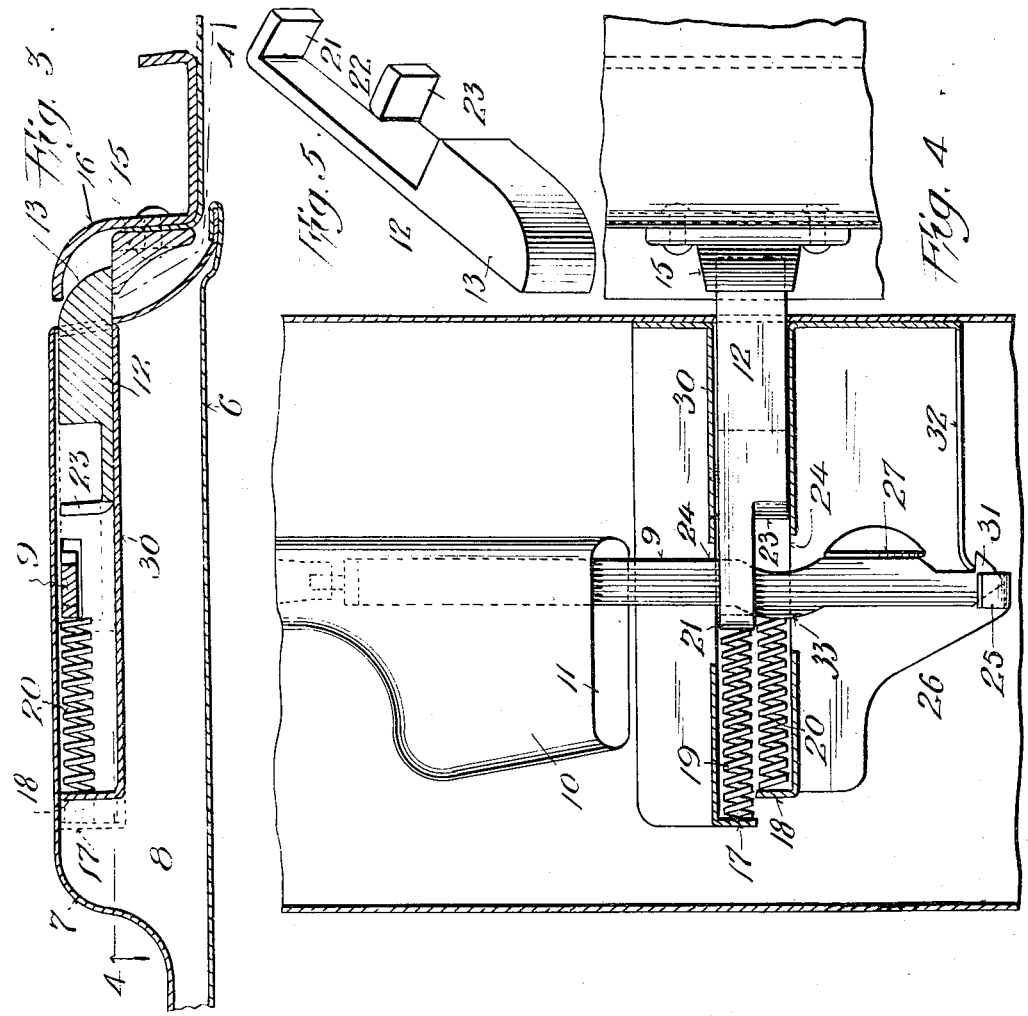
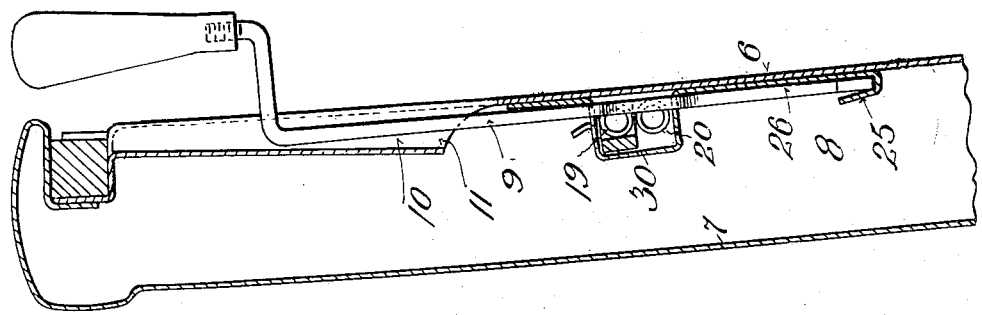
Inventor
Joseph Ledwinka
by his atty Daniel E. Darby

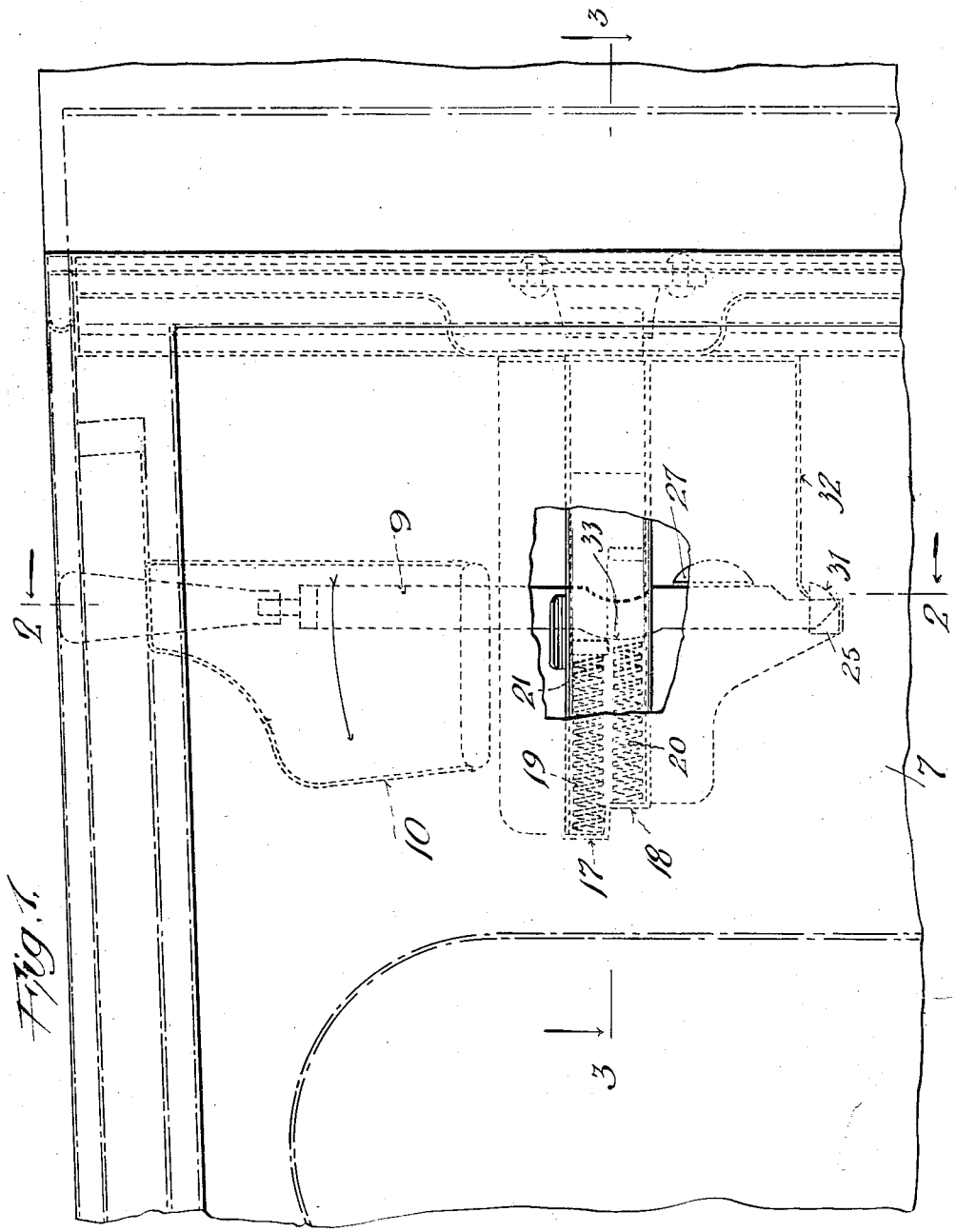

Patented Feb. 6, 1923.

1,443,959

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

LOCK MECHANISM FOR AUTOMOBILE DOORS.

Application filed April 4, 1919. Serial No. 287,428.

*To all whom it may concern:*

Be it known that I, JOSEPH LEDWINKA, a citizen of the United States, residing at Philadelphia, county of Philadelphia, State of Pennsylvania, have made a new and useful Invention in Lock Mechanism for Automobile Doors, of which the following is a specification.

This invention relates to lock mechanism for automobile doors.

The object of the invention is to provide a lock mechanism for automobile doors which is simple in structure, economical to manufacture and efficient in operation, and wherein the parts can be easily and quickly assembled or removed.

A further object of the invention is to provide a lock mechanism of the nature referred to wherein the bolt operating lever is at all times maintained under tension to prevent the same from rattling.

A further object is to provide a lock mechanism of the nature referred to which avoids the use of pivots, screws or rivets, for the operating parts thereof, and which can be readily taken apart from the outside of the door panel.

Other objects of the invention will appear more fully hereinafter.

The invention consists substantially in the construction, combination, location and relative arrangement of parts, all as will be more fully hereinafter set forth, as shown in the drawings forming part hereof, and finally pointed out in the appended claims.

In the drawings,—

Fig. 1 is a view in elevation of a door applied to an automobile body, and showing an arrangement of lock mechanism embodying my invention, parts of the automobile body and door being broken off and parts of the door broken away.

Fig. 2 is a section through the door and lock mechanism on the line 2, 2, Fig. 1, looking in the direction of the arrows.

Fig. 3 is a similar view on the line 3, 3, Fig. 1, looking in the direction of the arrows.

Fig. 4 is a similar view on the line 4, 4, Fig. 3, looking in the direction of the arrows.

Fig. 5 is a detached detail view in perspective of a locking bolt employed in connection with my invention.

The same part is designated by the same reference numeral wherever it occurs throughout the several views.

It is a common practice in automobile manufacture to construct the doors of sheet metal panels suitably pressed to the desired shape and contour and secured together at their edges to constitute the door structure, the panels being offset or separated from each other a sufficient distance to form an interior chamber between them. It is also a common practice to locate the door locking bolt within this chamber, said bolt extending through an opening in the edge wall of the door, and to provide an operating lever for the bolt which extends into the chamber between the door panels for operating engagement with the bolt, said lever being manipulated from the exterior of the chamber to accomplish the desired bolt operation.

My present invention relates to a lock mechanism of this nature for use in connection with a door structure of the character referred to, and the special objects I have in view is the provision of a locking structure in which the parts can be readily and easily removed or inserted in operative relation from the exterior of the chamber formed by the door panels, and wherein I avoid the use of pivot pins, securing rivets or screws for the operating parts of the lock.

A further special object is attained of great simplicity and economy in the manufacture and assembling of the parts.

Referring to the drawings, the inner and outer sheet metal door panels 6, 7, are stamped and shaped in the desired manner and are assembled and secured together in any desired way to form the door. In assembling these panels, a pocket or space 8, is formed between them, into which space the lock bolt operating lever 9 extends. For this purpose a portion of the door panel 6 is pressed out to form a recess 10 on the outer face of the panel in which the outer end of the lever is accommodated and operates. In pressing out the portion of the panel to form the recess 10 a slot or opening 11 is formed through the panel and the lever 9 extends through this opening into the chamber 8. The bolt 12 is formed with a nose portion 13, see Figs. 3 and 5, which is rounded off to cooperate with the striker 15, carried by the door post 16, whereby, in closing the door, the bolt will be pressed inwardly until it clears the striker when it will spring outwardly and engage behind the striker and lock the door closed. The bolt extends through an opening in the edge of the door and works in a housing 30, applied to the interior surface of the inner door panel 6. This housing is formed of a sheet steel stamping and is spot welded or otherwise secured to the door panel. It is formed at its extreme inner end with laterally extending lips 17, 18, which form abutments for the bolt and lever tension springs 19, 20 respectively. The end of the shank of the bolt 12 is provided with a lateral projection 21 to form an abutment, the spring 19 being interposed between the two abutments 17, 21, and exerting a yielding tension on the bolt tending to project the nose 13 outwardly through the edge of the door. The shank of the bolt is cut away on one side, as shown at 22, Fig. 5, and is formed with a laterally extending projection 23. The bolt operating lever 9 extends transversely through openings 24 in the sides of the housing 30, and through the space left by cutting away the side of the bolt shank, and between the two lateral projections 21, 23, on the bolt shank. The extreme inner end of the operating lever is stepped in a seat formed by turning up a lip 25 from the end of an extension 26 of the bolt housing stamping. This housing stamping is also formed with an upturned lip 27 which forms a stop for the forward movement of the lever. The lever is yieldingly pressed against said stop by the spring 20, which is located within the bolt housing 30 and interposed between the abutment 18 of the housing and the lever, as clearly shown in Fig. 4. The yielding tension thus interposed on the bolt operating lever holds the latter against rattling. The bolt spring 19, which is also disposed within the housing, and interposed between the housing abutment 17, and the lateral projection 21 of the bolt, serves to press the bolt towards its projected position and with the lateral projection 21 thereof bearing against the rear edge of the operating lever 9. This arrangement prevents the bolts from being projected too far and at the same time insures immediate and coincident bolt withdrawing movement when the bolt operating lever is shifted from the limit of its forward movement. The bolt therefore instantly responds to the operating lever withdrawal movement.

The extreme end of the lever 9 is formed with a shoulder 31, which, when said lever is fully inserted into working position, is engaged by a spring tongue 32, carried by the bolt housing. This tongue may be conveniently formed by stamping it out of the metal of the plate from which the bolt housing is formed.

After the door panel has been stamped out to form the recess 10 and slot 11, and the bolt housing 30 has been stamped out and applied and secured to the inner surface of the panel, the operation of assembling the lock mechanism is very simple and may be quickly and easily accomplished. The springs 19, 20, are dropped into the housing and the bolt shank is inserted into the housing. By pressing the bolt inwardly a sufficient distance, the end of the lever 9 is inserted from the outside through the panel opening 11, and is permitted to pass through the openings 24 in the housing and between the projections 21, 23, of the bolt shank. During this inserting movement the passage of the lever past the lever tension spring is facilitated by forming the lever with a curved projection 33, on its rear edge. This, however, is not an absolutely essential feature. The inserting movement of the lever is continued until the shoulder 31 at the end of the lever snaps past the spring tongue 32, and the end of the lever becomes seated in the seat 25. The mechanism may be disassembled, in like manner, and easily and expeditiously by manipulation from the outside. The bolt is pressed back from its extreme forward projection as far as it will go when, by slightly rocking the lever, the shoulder 31, is disengaged from the tongue 32, and then the lever may be withdrawn.

It will be seen from the foregoing description, taken in connection with the drawings, that an exceedingly simple, efficient and economical lock mechanism is produced. The parts can be easily and quickly assembled or taken apart. No pivot studs, screws or rivets, or other securing devices are required. The operating lever is constantly maintained under a spring tension which prevents the noise of rattle or looseness. The lock mechanism can be assembled or taken apart from outside the door and after the door is constructed or installed on a car. But few parts are employed and these are all of simple structure and easily manufactured.

Having now set forth the objects and nature of my invention, and a construction embodying the principles thereof, what I claim as new and useful, and of my own invention, and desire to secure by Letters Patent is,—

1. A structure of the class described comprising a bolt housing, a latch bolt slidably mounted therein, said latch bolt having one side thereof cut away to form a recess and a pair of fingers spaced apart from each other and disposed to project across said recess, an operating lever extending through said housing and operating between said fingers, a spring engaging one of said fingers to project the bolt, and another spring engaging said lever to yieldingly hold it under tension at its limit of movement in one direction to prevent rattling.

2. A structure of the class described comprising a bolt housing, a latch bolt slidably mounted therein, said latch bolt having one side thereof cut away to form a recess and a pair of fingers spaced apart from each other and disposed to project across said recess, an operating lever extending through said housing and operating between said fingers, a spring interposed between the end of said housing and one of said fingers, and another spring interposed between the end of said housing and said lever.

3. In a door structure, a panel having a slot therethrough, a housing secured to one face of said panel, a bolt extending into said housing, a spring located in the housing and engaging the bolt to project the same, a lever extending through the slot in the panel and transversely through the housing and detachably engaging said bolt, said lever having a shoulder at its inner extremity, and a spring tongue with which said shoulder detachably engages.

4. In a door structure, a panel having a slot therethrough, a housing secured to one face of said panel, a bolt extending into said housing, a spring located in the housing and engaging the bolt to project the same, a lever extending through the slot in the panel and transversely through the housing and detachably engaging said bolt, said lever having a shoulder at its inner extremity, said housing having a spring tongue with which said shoulder detachably engages and a tension spring engaging said lever.

5. In a door structure, a panel having a slot therethrough, a housing secured to one face of said panel, a bolt extending into said housing, a spring located in the housing and engaging the bolt to project the same, a lever extending through the slot in the panel and transversely through the housing and detachably engaging said bolt, said housing having an upturned lip to form a seat, and also having a spring tongue adjacent said seat, the end of said lever being seated in said seat and formed with a shoulder to detachably engage said tongue.

6. In a door structure, a panel having a slot therethrough, a housing secured to one face of said panel, a bolt extending into said housing, a spring located in the housing and engaging the bolt to project the same, a lever extending through the slot in the panel and transversely through the housing and detachably engaging said bolt, said lever having a projected curved edge surface at the portion thereof which lies within the housing, and a second spring located in the housing and engaging said curved surface of the lever.

7. In a door structure, a panel having a slot therethrough, a housing secured to one face of said panel, a bolt extending into said housing, a spring located in the housing and engaging the bolt to project the same, a lever extending through the slot in the panel and transversely through the housing and detachably engaging said bolt, said lever having a shoulder at its inner end, and yielding means detachably snapping over said shoulder when said lever is inserted through the housing and into position for use, said yielding means normally operating to prevent the withdrawal of said lever.

8. A structure of the class described, comprising a bolt housing, a latch bolt slidably mounted therein, a spring located in the housing and engaging the bolt to project the same, a lever extending through the housing and detachably engaging said bolt, said lever having a shoulder at its inner end, and a spring tongue with which said shoulder detachably engages.

9. A structure of the class described, comprising a bolt housing, a latch bolt slidably mounted therein, a spring engaging said bolt to project the same, a lever extending through said housing and detachably engaging said bolt, said lever having a shoulder at its inner end, a spring tongue carried by said housing and detachably engaging said shoulder, and a spring engaging said lever.

10. A structure of the class described, comprising a bolt housing, a latch bolt slidably mounted therein, a spring engaging said bolt to project the same, and a lever extending transversely through the housing and detachably engaging said bolt, said housing having an upturned lip to form a seat and a spring-tongue adjacent said seat, the end of said lever being seated in said seat, and provided with a shoulder detachably engaged by said tongue.

11. A structure of the class described, comprising a bolt housing, a latch bolt slidably mounted therein, a spring engaging said bolt to project the same, a lever extending transversely through said housing and detachably engaging said bolt, said lever having a projected curved edge surface at the portion thereof which lies within the housing, and a second spring located in the housing and engaging said curved surface of the lever.

12. A structure of the class described, comprising a bolt housing a latch bolt slidably mounted therein, a spring engaging said bolt to project the same, a lever extending transversely through the housing and detachably engaging said bolt, said lever having a shoulder at its inner end, and yielding means detachably snapping over said shoulder when said lever is inserted through the housing and into position for use, said yielding means normally operating to prevent the withdrawal of said lever.

13. A structure of the class described, comprising a latch plate including a bolt housing and a lever fulcrum, a latch bolt slidably mounted in said housing, a lever extending transversely through said housing, detachably engaging said bolt and having its inner end seated on said fulcrum, said lever being provided with a shoulder near its inner end, and yielding means detachably engaging said shoulder and normally operating to hold said lever on its fulcrum.

In testimony whereof I have hereunto set my hand on this 29th day of March A. D., 1919.

JOSEPH LEDWINKA.